(12) United States Patent
Chidambaram et al.

(10) Patent No.: US 11,875,234 B2
(45) Date of Patent: Jan. 16, 2024

(54) SYSTEMS AND/OR METHODS FOR MACHINE-LEARNING BASED DATA CORRECTION AND COMPLETION IN SPARSE DATASETS

(71) Applicant: Software AG, Darmstadt (DE)

(72) Inventors: Vijay Anand Chidambaram, Chennai (IN); Ulrich Kalex, Potsdam (DE)

(73) Assignee: SOFTWARE AG, Darmstadt (DE)

( * ) Notice: Subject to any disclaimer, the term of this patent is extended or adjusted under 35 U.S.C. 154(b) by 833 days.

(21) Appl. No.: 16/932,066

(22) Filed: Jul. 17, 2020

(65) Prior Publication Data

US 2021/0357706 A1 Nov. 18, 2021

(30) Foreign Application Priority Data

May 14, 2020 (IN) .............................. 202011020330

(51) Int. Cl.
*G06F 7/00* (2006.01)
*G06N 20/00* (2019.01)
*G06Q 10/06* (2023.01)
*G06F 18/23213* (2023.01)
*G06F 16/28* (2019.01)

(52) U.S. Cl.
CPC ........... *G06N 20/00* (2019.01); *G06F 16/285* (2019.01); *G06F 18/23213* (2023.01); *G06Q 10/06* (2013.01)

(58) Field of Classification Search
CPC . G06N 20/00; G06F 16/285; G06F 18/23213; G06Q 10/06
USPC ................................................. 707/600–899
See application file for complete search history.

(56) References Cited

U.S. PATENT DOCUMENTS

2014/0089613 A1* 3/2014 Kramer ................. G06F 12/122
711/E12.071

OTHER PUBLICATIONS

Wai Yan Lai et al., "A Study on Sequential K-Nearest Neighbor (SKNN) Imputation for Treating Missing Rainfall Data," 10th International Conference on Computing, Technology and Engineering (ICCTE 2019), May 2019, 6 pages.
SAG—Alfabet: IT Portfolio Management, electronically retrieved Jul. 17, 2020, 10 pages. https://www.softwareag.com/en_corporate/platform/alfabet/it-portfolio-management.html.

(Continued)

*Primary Examiner* — Isaac M Woo
(74) *Attorney, Agent, or Firm* — Nixon & Vanderhye P.C.

(57) ABSTRACT

Certain example embodiments herein relate to techniques for automatically correcting and completing data in sparse datasets. Records in the dataset are divided into groups with properties having similar values. For each group, one or more properties of the records therein that is/are to be ignored is/are identified, based on record distances relative to the records in the group, and distances among values for each of the properties of the records in the respective group. The records in the groups are further divided into sub-groups without regard to the one or more properties that is/are to be ignored. The sub-groups include a smaller and more cohesive set of records. For each sub-group: based on the records therein, predicted values to be applied to values identified as being empty but needing to be filled in are determined; and those predicted values are applied. The corrected/completed dataset is provided as output.

21 Claims, 11 Drawing Sheets

(56) References Cited

OTHER PUBLICATIONS

TIBCO—TIBCO EBX Software, electronically retrieved Jul. 17, 2020, 7 pages. https://www.tibco.com/products/tibco-ebX-software.
"6 Different Ways to Compensate for Missing Values in a Dataset (Data Imputation with Examples)," Popular Strategies to Statistically Impute Missing Values in a Dataset, Jan. 5, 2019, 8 pages. https://towardsdatascience.con1/6-different-ways-to-compensate-for-missing-values-data-imputation-with-examples-6022d9ca0779?gi=72570e676dbd.
Wikipedia—K-nearest Neighbors Algorithm, electronically retrieved July 17, 2020, 13 pages. https://en.wikipedia.org/wiki/K-nearest_neighbors_algorithm.
Wikipedia—Machine Learning, electronically retrieved Jul. 17, 2020, 14 pages. https://en.wikipedia.org/wiki/Machine_learning.
Wikipedia—Cluster Analysis, electronically retrieved Jul. 17, 2020, 15 pages. https://en.wikipedia.org/wiki/Cluster_analysis.
Microsoft—Machine Learning: ml.net, electronically retrieved Jul. 17, 2020, 4 pages. https://dotnet.microsoft.com/apps/machinelearning-ai/ml-dotnet.

\* cited by examiner

Fig. 3

| Application.ID | Property 1 | Property 2 | Property 3 | Property 4 | Property 5 | Property 6 | Property 7 | Property 8 |
|---|---|---|---|---|---|---|---|---|
| APP-10 | Active | IT Support | Yes | 0 | Pacific | 0 | No | TRUE |
| APP-11 | Active | IT Support | No | | Pacific | Monthly | Yes | TRUE |
| APP-12 | Active | IT Support | No | | Pacific | others | Yes | TRUE |
| APP-13 | Active | IT Support | No | | Pacific | Annual | Yes | TRUE |
| APP-14 | Active | IT Support | No | | Pacific | others | Yes | TRUE |
| APP-15 | Active | Platform Support | Yes | 0 | | 0 no plan | Yes | TRUE |
| APP-16 | Active | IT Support | Yes | | Mountain | | 0 Yes | FALSE |
| APP-17 | Decommissioned | IT Support | Yes | | Hawaii | | 0 Yes | FALSE |
| APP-18 | Active | IT Support | Yes | | Mountain | | 0 Yes | FALSE |
| APP-19 | Active | IT Support | Yes | | Eastern | others | No | FALSE |
| APP-20 | Planning | Hardware Support | | 0 | Eastern | Annual | No | FALSE |
| APP-21 | Active | IT Support | No | | Eastern | Monthly | No | FALSE |

Fig. 4

| Application.ID | Cluster ID |
|---|---|
| APP-1518 | 1 |
| APP-1525 | 1 |
| APP-2538 | 2 |
| APP-2566 | 2 |
| APP-3576 | 3 |
| APP-3577 | 3 |
| APP-4581 | 4 |
| APP-5587 | 5 |
| APP-5608 | 5 |
| APP-5611 | 5 |

| Application.ID | Cluster ID | ResponsibleUser | Platform | Need for Change | ICTObject | Domain | ApplicationType |
|---|---|---|---|---|---|---|---|
| APP-2518 | 2 | Alfons Alfabet | EAI Platform 2.2 Platform | | 4 Mafo-Portal | A.5.1 Deliver & run IT services | Client Server |
| APP-2525 | 2 | No Value | No Value | No Value | Mafo-Portal | No Value | No Value |
| APP-2538 | 2 | Alfons Alfabet | EAI Platform 2.2 Platform | | 4 Mafo-Portal | No Value | Client Server |
| APP-2566 | 2 | No Value | EAI Platform 2.2 Platform | No Value | Mafo-Portal | No Value | Client Server |
| APP-2576 | 2 | Erika Mustermann | No Value | | 5 SAP Template | A.1.1 Corporate Planning | Client Server |
| APP-2577 | 2 | Erika Mustermann | EAI Platform 2.2 Platform | | 4 Mafo-Portal | No Value | Client Server |
| APP-2581 | 2 | Erika Mustermann | EAI Platform 2.2 Platform | | 3 Mafo-Portal | No Value | Mainframe |
| APP-2587 | 2 | Erika Mustermann | EAI Platform 2.2 Platform | | 2 Mafo-Portal | A.1.2 Collaboration | Client Server |
| APP-2608 | 2 | No Value | EAI Platform 2.2 Platform | | 3 Mafo-Portal | No Value | Client Server |
| APP-2611 | 2 | Halef Omar | No Value | No Value | SAP Template | No Value | Client Server |
| APP-2626 | 2 | Halef Omar | EAI Platform 2.2 Platform | | 5 SAP Template | No Value | Client Server |
| APP-2630 | 2 | Halef Omar | EAI Platform 2.2 Platform | | 4 SAP Template | No Value | Mainframe |
| APP-2645 | 2 | No Value | No Value | | 4 SAP Template | No Value | Client Server |
| APP-2656 | 2 | Alfons Alfabet | EAI Platform 2.2 Platform | | 5 SAP Template | No Value | No Value |

Fig. 9

| Cluster ID | ResponsibleUser | Platform | Need for Change | ICTObject | Domain | Application Type |
|---|---|---|---|---|---|---|
| 2 | 0.71 | 0.71 | 0.78 | 1 | 0.21 | 0.85 |

Fig. 10

| Cluster ID | ResponsibleUser | Platform | Need for Change | ICTObject | Domain | Application Type |
|---|---|---|---|---|---|---|
| 1 | 0.51 | 0.78 | 0.4 | 0.9 | 0.4 | 0.9 |
| 2 | 0.71 | 0.71 | 0.78 | 1 | 0.21 | 0.85 |
| 3 | 0.7 | 0.4 | 0.3 | 0.2 | 0.1 | 0.8 |
| 4 | 0.3 | 0.5 | 0.2 | 0.7 | 0.8 | 0.4 |
| 5 | 0.8 | 0.7 | 0.9 | 0.6 | 0.75 | 0.67 |

Fig. 11

| Application.ID | Cluster ID | Distance D(Object,Cluster) | Need for Change | Step 4 - Y(Object,Cluster,Property) | Step 5 - Z(Cluster,Property) | D^2 |
|---|---|---|---|---|---|---|
| APP-2518 | 2 | 2.5 | 4 | 0.7225 | 4.515625 | 6.25 |
| APP-2525 | 2 | 2 | 1 | 4.6225 | 18.49 | 4 |
| APP-2538 | 2 | 1.5 | 4 | 0.7225 | 1.625625 | 2.25 |
| APP-2566 | 2 | 1.8 | 1 | 4.6225 | 14.9769 | 3.24 |
| APP-2576 | 2 | 1 | 5 | 3.4225 | 3.4225 | 1 |
| APP-2577 | 2 | 2 | 4 | 0.7225 | 2.89 | 4 |
| APP-2581 | 2 | 2.1 | 3 | 0.0225 | 0.099225 | 4.41 |
| APP-2587 | 2 | 3.2 | 2 | 1.3225 | 13.5424 | 10.24 |
| APP-2608 | 2 | 2.8 | 3 | 0.0225 | 0.1764 | 7.84 |
| APP-2611 | 2 | 1.8 | 1 | 4.6225 | 14.9769 | 3.24 |
| APP-2630 | 2 | 1.7 | 5 | 3.4225 | 9.891025 | 2.89 |
| APP-2645 | 2 | 3 | 4 | 0.7225 | 6.5025 | 9 |
| APP-2656 | 2 | 1.2 | 4 | 0.7225 | 1.0404 | 1.44 |
|  |  | 3.153846154 |  | 25.6925 | 92.1495 | 59.8 |
|  |  | X(Cluster,Property) = 3.15 | Sum(Y) = 25.69 | Sum(Y(Object,Cluster,Property) *D(Object,Cluster)$^2$ ) = 92.1495 | Sum(D^2)=59.8 |  |
|  |  |  |  |  | sum of D(Object,Cluster)$^2$ * sum of Y(Object,Cluster,Property) =59.8*25.69 =1536.262 | S=92.1495/1536 =0.059 |

Fig. 12

| Cluster ID | ICTObject | Application Type | Need for Change | Platform | ResponsibleUser | Domain |
|---|---|---|---|---|---|---|
| 2 | 0.065 | 0.07 | 0.075 | 0.09 | 0.095 | 0.28 |

Fig. 13

| Application.ID | Cluster ID | ResponsibleUser | Platform | Need for Change | ICTObject | ApplicationType |
|---|---|---|---|---|---|---|
| APP-2518 | 2 | Alfons Alfabet | EAI Platform 2.2 Platform | | 4 Mafo-Portal | Client Server |
| APP-2525 | 2 | To Be Filled | To Be Filled | To Be Filled | Mafo-Portal | To Be Filled |
| APP-2538 | 2 | Alfons Alfabet | EAI Platform 2.2 Platform | | 4 Mafo-Portal | Client Server |
| APP-2566 | 2 | To Be Filled | EAI Platform 2.2 Platform | To Be Filled | Mafo-Portal | Client Server |
| APP-2576 | 2 | Erika Mustermann | To Be Filled | | 5 SAP Template | Client Server |
| APP-2577 | 2 | Erika Mustermann | EAI Platform 2.2 Platform | | 4 Mafo-Portal | Client Server |
| APP-2581 | 2 | Erika Mustermann | EAI Platform 2.2 Platform | | 3 Mafo-Portal | Mainframe |
| APP-2587 | 2 | Erika Mustermann | EAI Platform 2.2 Platform | | 2 Mafo-Portal | Client Server |
| APP-2608 | 2 | To Be Filled | EAI Platform 2.2 Platform | | 3 Mafo-Portal | Client Server |
| APP-2611 | 2 | Halef Omar | To Be Filled | To Be Filled | SAP Template | Client Server |
| APP-2626 | 2 | Halef Omar | EAI Platform 2.2 Platform | | 5 SAP Template | Client Server |
| APP-2630 | 2 | Halef Omar | EAI Platform 2.2 Platform | | 4 SAP Template | Mainframe |
| APP-2645 | 2 | To Be Filled | To Be Filled | | 4 SAP Template | Client Server |
| APP-2656 | 2 | Alfons Alfabet | EAI Platform 2.2 Platform | | 5 SAP Template | To Be Filled |

Fig. 15

| Application.ID | Cluster ID | Sub Cluster ID |
|---|---|---|
| APP-2518 | 2 | 1 |
| APP-2525 | 2 | 1 |
| APP-2538 | 2 | 1 |
| APP-2566 | 2 | 1 |
| APP-2576 | 2 | 2 |
| APP-2577 | 2 | 2 |
| APP-2581 | 2 | 2 |
| APP-2587 | 2 | 2 |
| APP-2608 | 2 | 3 |
| APP-2611 | 2 | 3 |
| APP-2626 | 2 | 3 |
| APP-2630 | 2 | 3 |
| APP-2645 | 2 | 3 |
| APP-2656 | 2 | 3 |

Fig. 16

| Application.ID | Cluster ID | Sub Cluster ID | ResponsibleUser | Platform | Need for Change | ICTObject | ApplicationType |
|---|---|---|---|---|---|---|---|
| APP-2518 | 2 | 1 | Alfons Alfabet | EAI Platform 2.2 Platform | | 4 Mafo-Portal | Client Server |
| APP-2525 | 2 | 1 | To Be Filled | To Be Filled | To Be Filled | Mafo-Portal | To Be Filled |
| APP-2538 | 2 | 1 | Alfons Alfabet | EAI Platform 2.2 Platform | | 4 Mafo-Portal | Client Server |
| APP-2566 | 2 | 1 | To Be Filled | EAI Platform 2.2 Platform | To Be Filled | Mafo-Portal | Client Server |
| APP-2576 | 2 | 2 | Erika Mustermann | To Be Filled | | 5 SAP Template | Client Server |
| APP-2577 | 2 | 2 | Erika Mustermann | EAI Platform 2.2 Platform | | 4 Mafo-Portal | Client Server |
| APP-2581 | 2 | 2 | Erika Mustermann | EAI Platform 2.2 Platform | | 3 Mafo-Portal | Mainframe |
| APP-2587 | 2 | 2 | Erika Mustermann | EAI Platform 2.2 Platform | | 2 Mafo-Portal | Client Server |
| APP-2608 | 2 | 2 | To Be Filled | EAI Platform 2.2 Platform | | 3 Mafo-Portal | Client Server |
| APP-2611 | 2 | 3 | Halef Omar | To Be Filled | To Be Filled | 5 SAP Template | Client Server |
| APP-2626 | 2 | 3 | Halef Omar | EAI Platform 2.2 Platform | | 5 SAP Template | Client Server |
| APP-2630 | 2 | 3 | Halef Omar | EAI Platform 2.2 Platform | | 4 SAP Template | Mainframe |
| APP-2645 | 2 | 3 | To Be Filled | To Be Filled | | 4 SAP Template | Client Server |
| APP-2656 | 2 | 3 | Alfons Alfabet | EAI Platform 2.2 Platform | | 5 SAP Template | To Be Filled |

Fig. 17

| Application.ID | Cluster ID | Sub Cluster ID | ResponsibleUser | Platform | Need for Change | ICTObject | ApplicationType |
|---|---|---|---|---|---|---|---|
| APP-2518 | 2 | 1 | Alfons Alfabet | EAI Platform 2.2 Platform | | 4 Mafo-Portal | Client Server |
| APP-2525 | 2 | 1 | Alfons Alfabet | EAI Platform 2.2 Platform | | 4 Mafo-Portal | Client Server |
| APP-2538 | 2 | 1 | Alfons Alfabet | EAI Platform 2.2 Platform | | 4 Mafo-Portal | Client Server |
| APP-2566 | 2 | 1 | Alfons Alfabet | EAI Platform 2.2 Platform | | 4 Mafo-Portal | Client Server |
| APP-2576 | 2 | 2 | Erika Mustermann | EAI Platform 2.2 Platform | | 5 SAP Template | Client Server |
| APP-2577 | 2 | 2 | Erika Mustermann | EAI Platform 2.2 Platform | | 4 Mafo-Portal | Client Server |
| APP-2581 | 2 | 2 | Erika Mustermann | EAI Platform 2.2 Platform | | 3 Mafo-Portal | Mainframe |
| APP-2587 | 2 | 2 | Erika Mustermann | EAI Platform 2.2 Platform | | 2 Mafo-Portal | Client Server |
| APP-2608 | 2 | 2 | Erika Mustermann | EAI Platform 2.2 Platform | | 3 Mafo-Portal | Client Server |
| APP-2611 | 2 | 3 | Halef Omar | EAI Platform 2.2 Platform | | 3 SAP Template | Client Server |
| APP-2626 | 2 | 3 | Halef Omar | EAI Platform 2.2 Platform | | 5 SAP Template | Client Server |
| APP-2630 | 2 | 3 | Halef Omar | EAI Platform 2.2 Platform | | 4 SAP Template | Mainframe |
| APP-2645 | 2 | 3 | Halef Omar | EAI Platform 2.2 Platform | | 4 SAP Template | Client Server |
| APP-2656 | 2 | 3 | Alfons Alfabet | EAI Platform 2.2 Platform | | 5 SAP Template | Client Server |

Fig. 18

SYSTEMS AND/OR METHODS FOR MACHINE-LEARNING BASED DATA CORRECTION AND COMPLETION IN SPARSE DATASETS

CROSS-REFERENCE TO RELATED APPLICATION

This application claims the benefit of Indian Provisional Application No. 202011020330 filed on May 14, 2020, the entire contents of which are hereby incorporated herein by reference.

TECHNICAL FIELD

Certain example embodiments described herein relate to techniques for automatically correcting and completing data in sparse datasets. More particularly, certain example embodiments described herein relate to systems and/or methods that use a machine learning algorithm to cluster data from a sparse dataset and apply property analysis and sub-clustering techniques to identify potential missing or out-of-bound property values of a class, and automatically correct it.

BACKGROUND AND SUMMARY

Computer software inclusive tools (including enterprise applications such as Alfabet, available from the assignee) recently have become available to assist in enterprise architecture management, as well as strategic planning for organizations. These tools tend to be data-driven products, and data typically is managed in a complex set of classes and properties in these enterprise applications (also sometimes referred to in the art as Information Systems). Data typically is sourced from various systems of record and complemented with manual user inputs. The data may comprise many classes in accordance with one or more meta-models. Alfabet is one example of a meta-modelling based application permitting data structures to be dynamically changed based on implementation needs, potentially enabling class models to achieve additional amounts of complexity.

Similar to other enterprise applications enabling decision support, the quality of decisions that can be taken with confidence typically is a function of the quality of such data. Indeed, the need for data completeness and correctness assessment is common to many enterprise applications that serve as decision support systems. Unfortunately, however, data about enterprise architecture, and enterprise strategic plans or operations tends to be sparse in nature. This tendency implies that certain characteristics stored as properties in the object model may apply to a subset of a given class, but not the entire class. Ensuring data quality for sparse datasets can be particularly difficult, as one cannot simply look for empty property values, as such data may not be available, relevant, or trustable given the nature of the sparse dataset and the object model. These concerns thus present data quality challenges.

Generally speaking, data quality is a measure of the condition of data based on factors such as accuracy, completeness, consistency, reliability, and currency (herein used to specify whether the data in question is current or up-to-date). Measuring data quality levels can help organizations identify data errors that need to be resolved and assess whether the data in their systems is fit to serve its intended purpose(s) such as, for example, for use in automated decision making and recommendation type applications.

Strategic planning and organization operation management, much like many other data-focused digital disciplines like customer management and citizen data management, are fields characterized by data that is incomplete in nature. For instance, it would not be meaningful to have an entry on a "partner" property for a person who is not married. In Information Technology management, this challenge arises in a variety of contexts. For instance, an application that does not process user information does not necessarily need to specify Personally Identifiable Information (PII) characteristics. In reality, many of those datasets can be considered sparsely populated in the sense that no value, or a NULL value, is provided for an object and a specific property. It is not unusual for rows in a dataset to only require ten percent or even less of the properties to be populated. But one difficulty that can arise is that one cannot always easily determine which of properties would have to be populated for a given row.

Master Data Management (MDM) is a discipline in the data quality assessment and improvement field. Most of the Data Quality Assessment tools used by MDM Systems use rules-based approaches. TIBCO EBX is one example that implements a rules-based approach to MDM. Rules-based approach implementations of MDM solutions incorporate rules to try to eliminate incorrect data from entering into the system to create an authoritative source of master data. Rules additionally can be used for detecting data gaps, removing duplicates, standardizing data, and identifying inconsistencies. For MDM problems with smaller or moderate numbers of properties with high fill-rates, the rules-based approach has shown practical successes.

Yet rules-based approaches unfortunately are impractical with large numbers of properties that are sparsely populated, as the complexity and number of rules for handling such situations can grow exponentially. Having a large numbers of properties typically would imply a number of rules in the low hundreds. Complex rules may be necessary in cases where values for one or a set of properties mandate other properties to be filled, or potentially even be filled with a specific subset of permissible values. For instance, for a process that is determined to have Sarbanes-Oxley Act (SOX) implications and is executed in connection with a U.S. legal entity, certain other properties such as annual financial transaction volume would be mandatory. Identification of relevant data gaps can be challenging. Sometimes even more difficult or complex could be the need to address inconsistencies and perform data imputation with the correct values (e.g., rather than updating all the data gap cells in the dataset). This may be especially true when the number of properties is large and the datasets are sparsely populated.

In a typically large dataset, a number of records will be represented in rows, with different properties being represented in different columns Realistic datasets in strategic planning and organization operation management easily will have millions of rows and thousands of columns There are a number of techniques for imputation of missing values in a dataset. For example, in a k-nearest neighbor (KNN) related approach, a missing value can be filled with the mean value of the corresponding property of the nearest neighbor of the corresponding row that has no missing values. As another example, a sequential k-nearest neighbor (SKNN) related approach separates the dataset into incomplete and complete sets, with missing and without missing values, respectively. Starting with the fewest number of missing values, the missing value is filled by the weighted mean value of corresponding property of the nearest neighbor of the corresponding row in the complete set.

These and/or other imputation approaches typically are focused on filling all empty values in the dataset. And in this regard, all missing data may be supplied by the mean, weighted mean, median, most frequently used values of the property, etc. For sparsely populated datasets, however, this may be an inappropriate strategy, as many if not most of the empty or null data values in the dataset might be "legitimately" empty or null. That is, the empty or null value for a record and a specific property actually may be a correct specification for the record and property. Thus, it will be appreciated that there is a need to distinguish between the data gaps representing undesired omission of a property value for a record, and legitimately undefined values. Data gaps in general are thought of as reducing the overall accuracy of the data in the dataset. Yet legitimately undefined data are non-filled and empty values that are deliberately left empty, as the record in this case does not require a value for the related property. Current approaches unfortunately do not account for the difference between data gaps and legitimately undefined data.

Certain example embodiments help address the above-described and/or other concerns. For example, certain example embodiments use a machine learning algorithm to cluster the data in a sparse dataset and apply property analysis and sub-clustering techniques to identify potential missing or out-of-bound property values of a class, and automatically correct it. Doing so can help address issues with the completeness of data, how up-to-date the data is, and consistency of data throughout different datasets, even for sparse datasets typically associated with enterprise applications that help manage enterprise architectures, organization operations, and enterprise strategic plans.

One aspect of certain example embodiments relates to using a machine learning based clustering approach based on similarity analysis using k-means clustering, followed by a score ranking based on distance and density of data values. A sub-clustering approach helps to determine data gaps and inconsistencies with high confidence, and automatic updating of the identified data gaps and inconsistencies (potentially without any human intervention) can be performed by adopting data completion techniques such as sequential k-nearest neighbor techniques.

Another aspect of certain example embodiments relates to addressing issues with completeness of data (e.g., where there is a high percentage of missing data entries), data that is not current and needs to be updated, and consistency of data throughout the datasets, e.g., even for datasets with many classes in many meta-models, and potentially for datasets with millions of records and hundreds or thousands of properties.

Another aspect of certain example embodiments relates to helping to ensure data quality for high quality digital decision support in many disciplines (including, for example, architecture management, organization operations management, and strategic planning), without focusing exclusively or in large part on merely filling data holes based on the assumption of highly densely populated datasets.

Certain example embodiments employ techniques including property score analysis, properties reduction for eliminating irrelevant properties from consideration, sub-clustering analysis for predicting missing values, and automatic updating of missing data with correct data, e.g., to help provide to a user a correct and complete dataset that otherwise would be sparse.

In certain example embodiments, there is provided a data imputation computer system, comprising an interface and at least one processor and a memory. The memory stores computer code executable by the at least one processor to perform functionality comprising: receiving over the interface a sparse dataset, the dataset having data records organized in one or more classes, each class having a plurality of properties associated therewith; dividing the data records in the dataset into a plurality of groups, each group including data records having properties with similar values; for each group, identifying one or more properties of the records in the respective group that is/are to be ignored based on both record distances relative to the records in the group, and distances among values for each of the properties of the records in the respective group; and further dividing the data records in the groups into sub-groups without regard to the one or more properties that is/are to be ignored, at least some of the sub-groups including a set of data records that is smaller and more cohesive than those in the groups from which they were generated. For each sub-group, values of the data records therein that are empty but are to be filled in are identified; based on the data records in the respective sub-group, predicted values to be applied to the values identified as being empty but needing to be filled in are determined; and the predicted values to be applied to the values identified as being empty but needing to be filled in are applied. The dataset corrected and/or completed using the applied predicted values is provided as output.

In certain example embodiments, a data imputation method for use with a computing system including at least one processor and a memory is provided. The method comprises: using the at least one processor, receiving over an interface a sparse dataset, the dataset having data records organized in one or more classes, each class having a plurality of properties associated therewith; dividing the data records in the dataset into a plurality of groups, each group including data records having properties with similar values; for each group, identifying one or more properties of the records in the respective group that is/are to be ignored based on both record distances relative to the records in the group, and distances among values for each of the properties of the records in the respective group; and further dividing the data records in the groups into sub-groups without regard to the one or more properties that is/are to be ignored, at least some of the sub-groups including a set of data records that is smaller and more cohesive than those in the groups from which they were generated. The method further comprises, for each sub-group: identifying values of the data records therein that are empty but are to be filled in; based on the data records in the respective sub-group, determining predicted values to be applied to the values identified as being empty but needing to be filled in; and applying the predicted values to be applied to the values identified as being empty but needing to be filled in. The dataset corrected and/or completed using the applied predicted values is provided as output.

In certain example embodiments, there is provided a non-transitory computer readable storage medium tangibly storing instructions that, when executed by at least one processor of a computing system, cause the computing system to perform functionality comprising: receiving over an interface a sparse dataset, the dataset having data records organized in one or more classes, each class having a plurality of properties associated therewith; dividing the data records in the dataset into a plurality of groups, each group including data records having properties with similar values; for each group, identifying one or more properties of the records in the respective group that is/are to be ignored based on both record distances relative to the records in the group, and distances among values for each of the properties of the records in the respective group; and further dividing the data records in the groups into sub-groups without regard to the one or more properties that is/are to be ignored, at least some of the sub-groups including a set of data records that is smaller and more cohesive than those in the groups from which they were generated. The functionality further comprises for each sub-group: identifying values of the data records therein that are empty but are to be filled in; based on the data records in the respective sub-group, determining predicted values to be applied to the values identified as being empty but needing to be filled in; and applying the predicted values to be applied to the values identified as being empty but needing to be filled in. Additionally, the functionality further comprises providing as output the dataset corrected and/or completed using the applied predicted values.

According to certain example embodiments, the groups may be clusters generated via a first clustering algorithm and the sub-groups may be sub-clusters generated from the clusters using a second clustering algorithm. The first and second clustering algorithms may be the same or different from one another in different example embodiments. In certain example embodiments, the first clustering algorithm may be a k-means clustering algorithm, and the second clustering algorithm may be a sequential k-Nearest Neighbor clustering algorithm.

According to certain example embodiments, the record distances relative to the records in the group may be distances to the respective cluster's centroid.

According to certain example embodiments, an identification of one of the one or more classes may be received, and the division of the data records in the dataset into the plurality of groups may divide the data records based on the identified class(es).

According to certain example embodiments, the identifying may further comprise calculating a property score for each property in each group, e.g., with the property score for a given property in a given group being the number of non-empty values for the given property divided by the total number of data records in the given group. In certain example embodiments, the identifying may yet further comprise weighting the distances among the values for each of the properties of the records in the respective group with the record distances relative to the records in the group; calculating final property reduction scores by dividing the weighted distances by the corresponding property scores; and determining which property(ies) is/are to be ignored based on a comparison between the calculated final property reduction scores and a predetermined threshold.

According to certain example embodiments, the predicted value for a given property in a given sub-group may be the most common non-null value for the given property among the data records in the given sub-group.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is a screenshot listing the properties, along with their respective field types, which may be used in connection with certain example embodiments;

FIG. 4 is an example table including cleaned and preprocessed data in accordance with certain example embodiments;

FIG. 9 is a table showing the applications clustered in Cluster ID 2, together with illustrative properties, in an example dataset;

FIG. 10 is a table showing the property score values for application cluster ID 2 from the example dataset;

FIG. 11 is a table showing the property score values for all five application clusters in the example dataset;

FIG. 12 is a table showing how the score for the property called "Need for Change" in the example dataset is calculated;

FIG. 13 is a table showing the results of properties reduction for the sample dataset;

FIG. 15 is a table showing empty values in the property-reduced dataset marked as needing to be filed, in accordance with certain example embodiments;

FIG. 16 is a table showing example output from step S1420 in the FIG. 14 flowchart for Cluster ID 2 in the example dataset;

FIG. 17 is a table showing classes (applications) grouped based on Cluster ID and Sub-Cluster ID in the example dataset; and FIG. 18 is a table showing missed values in the example dataset updated with popular values for the properties in that sub-cluster.

DETAILED DESCRIPTION

Figure 1:
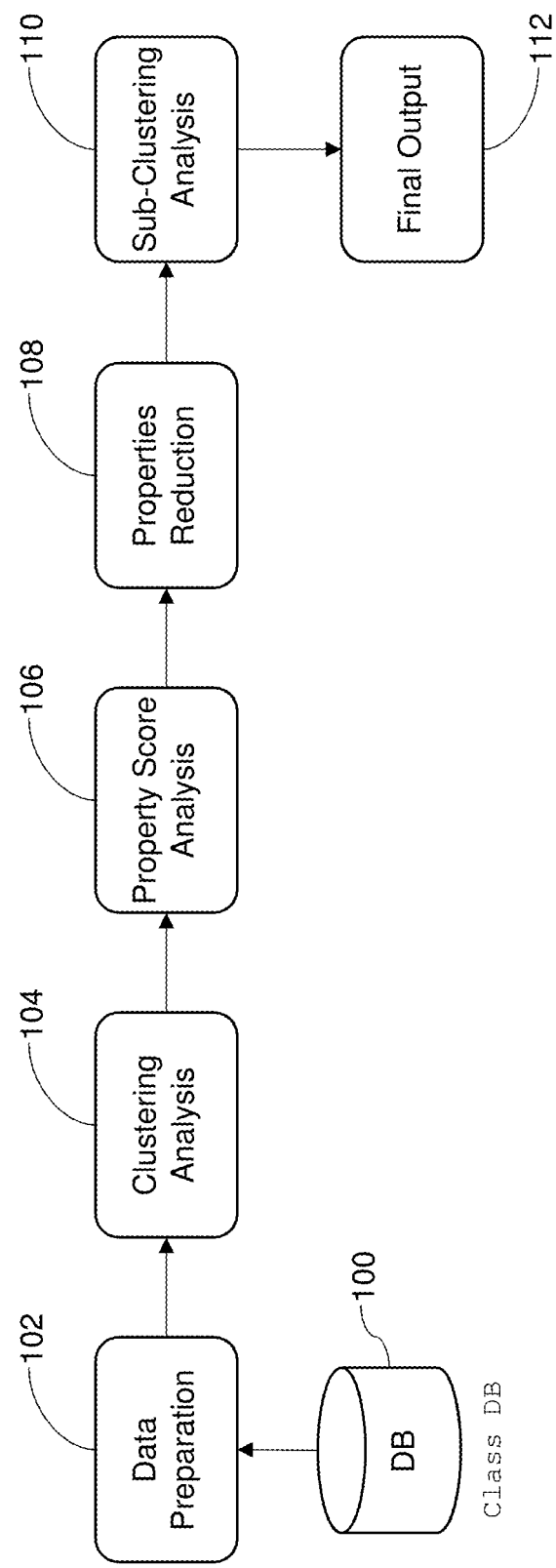
FIG. 1 is an end-to-end view of a machine learning (ML) approach to ensuring data correction and completion for sparse datasets, which may be used in connection with certain example embodiments.

Certain example embodiments use a machine learning algorithm to cluster data from a sparse dataset and apply property analysis and sub-clustering techniques to identify potential missing or out-of-bound property values of a class, and automatically correct it. Doing so can help address issues with the completeness of data, how up-to-date the data is, and consistency of data throughout different datasets, even for sparse datasets typically associated with enterprise applications that help manage enterprise architectures, organization operations, and enterprise strategic plans.

In certain example embodiments, a similarity approach is used to divide the dataset into similar subsets (e.g., along the rows or records). These subsets typically will be populated with thousands (or more) of records, with the records having hundreds of properties. By virtue of the similarity-based clustering, the records in a cluster will have similar behavior(s) among the properties. Each of the resulting sub-datasets will form a cluster of similarity, and the total distance of cluster objects from the centroid of the cluster can be used as a measure of cohesion.

For the case of a densely populated dataset, this approach might be enough or close to enough to providing a basis for data imputation, as known techniques could be applied to determine the values that should be used to fill the empty cells in the datasets for each of the similarity clusters. In such cases, data correctness for imputed data can be assumed or reasonably relied upon because of the comparatively large amount of data in the dataset. Simply stated, data imputation algorithms work well in these scenarios. For sparsely populated datasets, however, this is not the case, as most of the empty values may be "legitimately" empty and existing techniques will be insufficient to provide quality data imputation and results that can be trusted. That is, the initial clustering may be too coarse to result in better predictions desirable for certain example use cases and for sparsely populated data sets. Those skilled in the art are able to distinguish between "dense datasets" and "sparse datasets." Typically, sparse data means that there are many gaps present in the data being recorded. Consider the example of sensor data, which can collect both sparse and dense data. The sensor may send a signal only when the state changes, such as when there is a movement of the door in a room. This data will be obtained intermittently because the door is not always moving. Hence, this is sparse data. However, if the sensor records (for example) wind speed, temperature, etc., the values can change (and thus be recorded) constantly. Thus, the dataset that is obtained is dense. Sparse data is also known as such because the information that it represents is rare. This in turn tends to make the information very valuable (useful), e.g., organizations often make assumptions or decisions based on the sparse data that they have collected. There is a potential technical differentiation that may exist as between dense and sparse data in that, in at least some instances, dense data tends to be received in a constant manner whereas sparse data is received only at specific time intervals or sporadically (e.g., upon the occurrence of an event). Those skilled in the art are capable of distinguishing between dense and sparse data using these or other heuristics or guideposts as will be familiar to them, e.g., based on the field or type of data involved, etc.

To help address these issues that arise in the context of sparse datasets, certain example embodiments aim to further increase the cohesion in the cluster by reducing the properties to those that have highest degrees of similarity along the properties with non-NULL-values and thrashing those that have no relevance (or at least no perceivable relevance) to the objects in the cluster (among properties that have all or predominantly NULL values for the objects in the cluster). In this regard, those properties that are either trivial or ambiguous or inconclusive are removed from consideration after forming initial clusters. The remaining properties are deemed to be the most important for expressing the data behavior in the clusters. This "properties reduction" approach can be accomplished by considering a combination of the record distance from the cluster centroid and the value distance along each of the properties. Minimizing this "double-weighted" distance helps provide for the desired increase of cohesion within the respective clusters. This approach can in turn lead to an increase in cohesion by one or more orders of magnitude in at least some cases, compared to situations in which clustering is used without using the double-weighted distance to reduce the number of properties considered in connection with the sub-clustering. This approach also helps determine a uniquely descriptive subset of properties for each of the clusters. Reducing the dimension of the data improves the speed of convergence and the quality of results. Doing so can help increase the accuracy of the imputation, and make data imputation possible for sparsely populated datasets.

Each of the clusters, with its reduced set of properties, is subjected to another set of clustering related techniques based on similarity analysis. The further round(s) of clustering is/are a sub-clustering approach that generates sub-clusters. The cohesion in each of the resulting sub-clusters is further increased. Furthermore, each of these sub-clusters now represents a highly densely populated dataset, thereby making it possible to adopt known approaches in closing data gaps in densely populated datasets using existing approaches such as, for example, sequential k-Nearest Neighbor (SKNN), etc.

Certain example embodiments therefore are advantageous in that they help to clearly separate legitimately undefined data from the data gaps to allow for automated data completion and correction efforts to focus on the data gaps. This is accomplished by a two-phased clustering approach, with a scoring-based property reduction interposed between the two phases, e.g., as described herein in greater detail.

Certain example embodiments operate on a large set of objects, pertaining to the same class and having a large number of properties (also sometimes referred to as dimensions, features, measures, columns, or the like). In certain example embodiments, for many of the objects, many of the properties are not actually populated, and the properties that are not populated can differ from object to object. With this approach in mind, certain example embodiments provide a multi-step machine learning (ML) based automated data quality related technique.

FIG. 1 is an end-to-end view of an ML approach to ensuring data correction and completion for sparse datasets, which may be used in connection with certain example embodiments. Data preparation 102 involves the preprocessing of data 100 on which the ML algorithms will work. Data preparation 102 includes, for example, converting the original objects and properties in the original data 100 into records and properties, replacing references (identifiers) with strings, and filling blanks with a distinguishable, default or recognizable value for the machine learning algorithms to use. The original data 100 may be stored locally or remotely on a non-transitory computer readable storage medium, in a database or database management system, or in any other suitable structured or unstructured data format. The data may be accessed using an application programming interface (API), web service, or any other suitable electronic data interface.

Cluster analysis with k-means clustering or other clustering technique 104 is performed after the data preparation 102. Cluster analysis can be defined as the task of identifying subgroups in a dataset such that records in the same subgroup (cluster) are very similar, while records in different clusters are significantly different. In certain example embodiments, k-means clustering is used, although other clustering techniques may be used in other example embodiments. As is known, k-means clustering is a technique of vector quantization, originally drawn from signal processing, that aims to partition N observations into K clusters in which each observation belongs to the cluster with the nearest mean (cluster center or cluster centroid), serving as a prototype of the cluster. The k-means clustering approach results in a partitioning of the data space into Voronoi cells. Because of the way it operates, k-means clustering minimizes within-cluster variances (e.g., squared Euclidean distances). The Euclidean distance between two points in either a plane or a three-dimensional space measures the length of a segment connecting the two points. Euclidean distance is a common approach for representing distance between two points and may be used in clustering approaches including k-means clustering. The mean optimizes squared errors, whereas the geometric median minimizes Euclidean distances. Euclidean solutions also can be found using k-medians and k-medoids. Clustering and k-means clustering have uses in data mining, pattern recognition, image analysis, information retrieval, bioinformatics, data compression, computer graphics, and the like.

The cluster analysis with k-means clustering 104 thus is used to find homogeneous subsets or groups within the dataset such that records in each subset or group are as similar as possible according to a similarity measure such as Euclidean distance or correlation-based distance. The exact selection of distance function can be left to the implementation. That is, different example embodiments may use different distance measures when forming the clusters. The clustering algorithm in certain example embodiments aims at minimizing the total sum of square distance across the entire dataset. With the first iteration of clustering, a "simple" similarity across the entire population is determined.

For each of the clusters, a scoring approach is used to determine those properties with highest cohesion and similarity. Properties thus are "reduced" prior to performing further clustering operations. With regard to the former, property reduction 108 based on score analysis 106 involves computing, for each property, a double-weighted distance using the record's distance from the centroid of the cluster and the value's distance from the median along the property. This is used as the scoring function to determine the score for each property and to eliminate properties based on the determined scores as described herein. This helps separate properties that are ambiguous or inconclusive, from the properties with highest degrees of cohesion across the cluster. This also helps remove trivial properties such as, for example, properties where all values are equal. The score analysis 106 enables the property reduction 108, as described in greater detail below.

Sub-cluster analysis with k-means clustering 110 is performed and involves a second iteration of clustering applied to each of the clusters and the respective reduced sets of properties with the highest cohesion. This second stage clustering allows a determination to be made as to the residual differences in the primary clustered set of records. It therefore results in a set of highly homogeneous smaller cluster datasets (sub-clusters) for each of the primary clusters.

By virtue of the final sub-clusters, there is provided a highly-densely and highly-similar dataset allowing the data gaps to be closed and data outliers to be corrected. Sequential k-nearest neighbor and/or other techniques may be used in sub-clustering related options in certain example embodiments.

The final output 112 of the auto-corrected dataset ultimately is provided. The final output 112 is advantageous in some or all of the following and/or other respects:

Completeness of data on the final clustering level, which significantly reduces the percentage of data gaps. Data completeness is improved by virtue of the improvement to the data imputation tools (e.g., by using the example techniques disclosed herein, which can operate on sparse datasets whereas conventional approaches cannot or at least cannot do so reliably).

Improved data quality by automatically applying the data completion and correction approach of certain example embodiments, potentially every time a significant data update to the dataset occurs (e.g., from a source system via integration), when activated by an authorized user, etc. Similar to above, then, data quality is improved by virtue of the improvement to the data imputation tools (e.g., by using the example techniques disclosed herein, which can operate on sparse datasets whereas conventional approaches cannot or at least cannot do so reliably).

Improved user guidance by predicting which of the clusters on the final clustering level a newly-added or manually-updated record would belong to, together with recommended data values based on the cluster behavior. It is possible that this could be used to help auto-complete or auto-correct records as or after they are added to a dataset in at least some scenarios. For example, the user interface could be used to help make users aware of specific data gaps, where important data is missing, etc. In some instances, the user interface may be configured such that suggestions as to how to fill those data gaps may be provided and presented for confirmation, automatically inserted and potentially identified as such afterwards, etc.

Increased consistency of data throughout the dataset.

Higher confidence in using the data for decision making and/or other tasks.

Example Implementation

Details concerning an example implementation are provided below. It will be appreciated that this example implementation is provided to help demonstrate concepts of certain example embodiments, and aspects thereof are non-limiting in nature unless specifically claimed. For instance, certain example clustering algorithms, distance measures, module configurations, etc., are provided below to ease understanding of the example embodiments described herein and are not limiting unless explicitly claimed. In certain example embodiments, software modules corresponding to the functionality disclosed in FIG. 1 can be implemented using ML.NET. ML.NET is a cross-platform open-source machine learning framework which makes machine learning accessible to .NET developers. It will be appreciated that other programming languages, paradigms, and/or the like, may be used in different example embodiments.

As alluded to in the previous paragraph, the end-to-end arrangement of FIG. 1 may be enabled by a collection of instructions executed on a computing system comprising processing resources. The processing resources may include, for example, at least one processor operably coupled to a memory. The memory may store software modules comprising the executable instructions to provide functionality including that described herein. It will be appreciated that the instructions for executing the functionality provided in the FIG. 1 end-to-end diagram may be grouped into modules corresponding to the blocks shown in FIG. 1 in certain example embodiments. Multiple software modules may be provided for each FIG. 1 block in certain example embodiments. The description that follows provides a further explanation in terms of the FIG. 1 blocks for ease of understanding. It will be appreciated that other execution approaches may be used in different example embodiments.

Example Data Preparation Related Techniques

Figure 2:
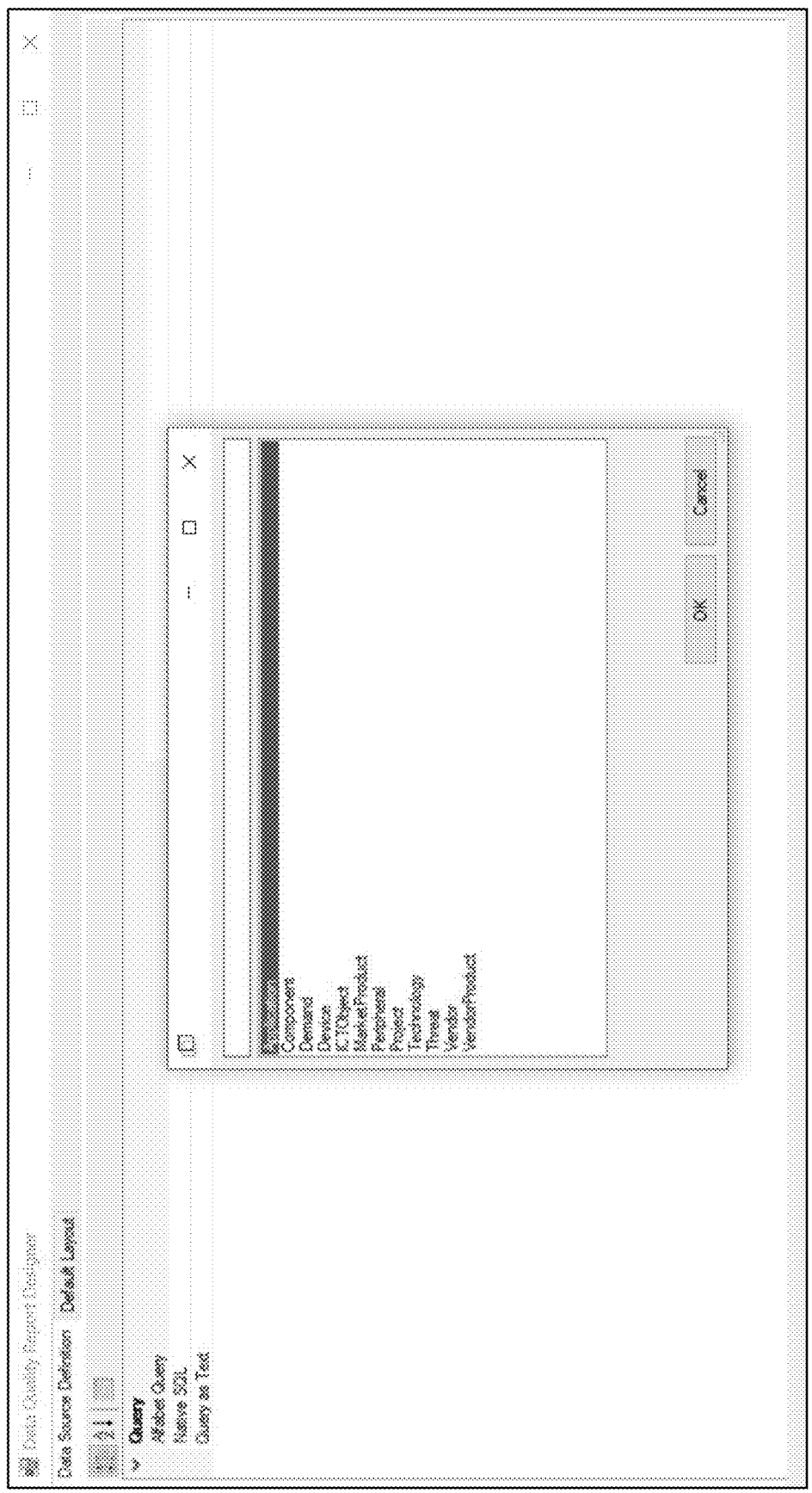
FIG. 2 is a screenshot of a data quality assistant user interface (UI) that may be used in connection with certain example embodiments.

A wizard or other type graphical user interface (GUI) or the like may be provided to assist with selections involved in data preprocessing, including data cleanup and other data preparation operations. FIG. 2, for example, is a screenshot of a data quality assistant user interface (UI) that may be used in connection with certain example embodiments. The FIG. 2 specific example shows a mockup of an Alfabet Assistant, which provides a graphical solution for selecting a class for which data quality reports are to be generated and/or for which the ML-based data imputation techniques of certain example embodiments are to be performed. The FIG. 2 screenshot lists several example classes specific to this example. In the discussion that follows, the "Application" class is used as an example to help demonstrate how the techniques of certain example embodiments operate. In this example, the Application class represents different software applications running on computer systems deployed in the network. Certain example embodiments are able to generate reports detailing how the sparse dataset related to this selected class can be corrected and completed, e.g., what missing values can be added, how the values to be added are calculated, etc. These reports may be reviewed by an authorized user or the like. Certain example embodiments may automatically update the dataset, or the user may cause the system to supply to the dataset the missing values, e.g., after having a chance to review reports.

After selecting a class, all of the properties of the class are auto-selected, but the user can deselect any one or more properties if desired. The selected properties will be used for the data quality analysis. FIG. 3 is a screenshot listing the properties (features), along with their respective field types (e.g., string, indicators, Boolean, integer, real, etc.), which may be used in connection with certain example embodiments. The caption information provides a short description for each of the properties. Further details of a selected class are displayable at the right of the FIG. 3 example screenshot.

Based on the selections, settings for the reports are generated. The settings may be saved in a configuration file (e.g., a Generic AI Reports configuration file) in a suitable file format or the like. This also may be thought of as providing report template information, that is, information about how to structure a report. In certain example embodiments, a structured format such as XML, JSON, or the like, may be used to specify the report format. A sample XML report template is provided below. In the same report template, ClassName is used to represent the dataset class for which the data quality analysis to be performed; ParentGroupRef is a mapping of the reference of each clustered dataset with a parent group for future analysis; Prefix names the cluster groups; and DataQualityFieldDef identifies properties of the class that are selected for the data quality analysis.

```
<?xml version="1.0" encoding="utf-8"?><DataQualityXMLDef
    xmlns:xsd="http://www.w3.org/2001/XMLSchema"
    xmlns:xsi="http://www.w3.org/2001/XMLSchema-instance"
    Query="ALFABET_QUERY_500
FIND
    
Application
" ClassName="Application"
    IndicatorType="579-293-0" ParentGroupRef="95-23-0"
    Stereotype="ApplicationGroup" Prefix="ClusterBISRR_10_"
    ReportRef="Reports" >
```

-continued

```
<DataQualityFields>
    <DataQualityFieldDef Caption="Responsible Organization"
    Name="ResponsibleOrganization" FieldType="Property"
    DisplayFieldType="Reference" Reference="0-0-0"
    IsExcludedInFactorAnalysis="false"
    IsSoftExcludedInFactorAnalysis="false"
    EditableCaption="Responsible Organization" />
        <DataQualityFieldDef Caption="License Policy"
    Name="ALFA_LICENSE_POLICY" FieldType="Property"
    DisplayFieldType="Reference" Reference="0-0-0"
    IsExcludedInFactorAnalysis="false"
    IsSoftExcludedInFactorAnalysis="false" EditableCaption="License
    Policy" />
        <DataQualityFieldDef Caption="Creator Reference"
    Name="CREATION_USER_REF" FieldType="Property"
    DisplayFieldType="Reference" Reference="0-0-0"
    IsExcludedInFactorAnalysis="false"
    IsSoftExcludedInFactorAnalysis="false" EditableCaption="Creator
    Reference" />
        <DataQualityFieldDef Caption="Statutory Language"
    Name="LEADLANGUAGE" FieldType="Property"
    DisplayFieldType="Integer" Reference="0-0-0"
    IsExcludedInFactorAnalysis="false"
    IsSoftExcludedInFactorAnalysis="false" EditableCaption="Statutory
    Language" />
        <DataQualityFieldDef Caption="User Satisfaction/User
    Satisfaction" Name="User Satisfaction/User Satisfaction"
    FieldType="Indicator" DisplayFieldType="Indicator"
    Reference="579-168-0" IsExcludedInFactorAnalysis="false"
    IsSoftExcludedInFactorAnalysis="false" EditableCaption="User
    Satisfaction/User Satisfaction" />
</DataQualityFields></DataQualityXMLDef>
```

The Generic AI Reports configuration XML report template includes a class identifier and identification of the properties of that class that are to be used in creating the primary dataset. The data quality analysis is then performed on this dataset. The XML that is created from the GUI tool explained above is read. The properties that are empty for all the rows are removed, as they do not help in data imputation. As explained above, properties may be automatically selected by the system (e.g., after a user selects a class), although the user may deselect properties (e.g., if they are not required, known to be irrelevant, etc.). In certain example embodiments, the techniques described herein may be implemented with no manual intervention.

Default values or flags are assigned to the empty cells, as machine learning algorithms typically cannot process null values. The default values to be used may be specified in the Generic AI Reports configuration XML report template, e.g., after being user-specified or set to a system default. In this case, a fixed string is provided for string data type properties, 0 is provided for number data type fields, and false is used for Boolean data type fields. These are the bare minimum default values that are required to be applied for the algorithms (which otherwise might not work with data considered invalid) and, later, these initial default values potentially will be replaced by the much better predicted values (or possibly left empty). FIG. 4 is an example table including cleaned and preprocessed data in accordance with certain example embodiments. As can be seen in FIG. 4, no fields are left blank or set to NULL.

Example Techniques for Clustering Analysis with k-means Algorithm

Clustering is a common exploratory data analysis technique that can be used to develop an intuitive sense about the structure of the data. As discussed above, clustering can be thought of as the task of identifying subgroups in the data such that data points in the same subgroup (cluster) are very similar, while data points in different clusters are very different. In other words, there is an effort to find homogeneous subgroups within the data such that data points in each cluster are as similar as possible according to a similarity measure such as Euclidean-based distance, correlation-based distance, or the like. The decision of which similarity measure to use may be application-specific and may vary in different example embodiments.

The k-means algorithm is an iterative algorithm that tries to partition the dataset into K predefined distinct non-overlapping subgroups (clusters), where each data point belongs to only one group. It tries to make the intra-cluster data points as similar as possible while also keeping the different clusters as different (far apart) as possible. It assigns data points to a cluster such that the sum of the squared distance between the data points and the cluster's centroid (arithmetic mean of all the data points that belong to that cluster) is at the minimum, at least when this distance metric is selected or implemented. The less variation present within clusters, the more homogeneous (similar) the data points are within the same cluster.

The k-means algorithm functions in accordance with the following description:
 Specify number of clusters K.
 Initialize centroids by first shuffling the dataset and then randomly selecting K data points for the centroids without replacement.
 Keep iterating until there is no change to the centroids, i.e., the assignment of data points to clusters is not changing.
 Compute the sum of the squared distance between data points and all centroids.
 Assign each data point to the closest cluster (centroid).
 Compute the centroids for the clusters by taking the average of the all data points that belong to each cluster.

Figure 5:
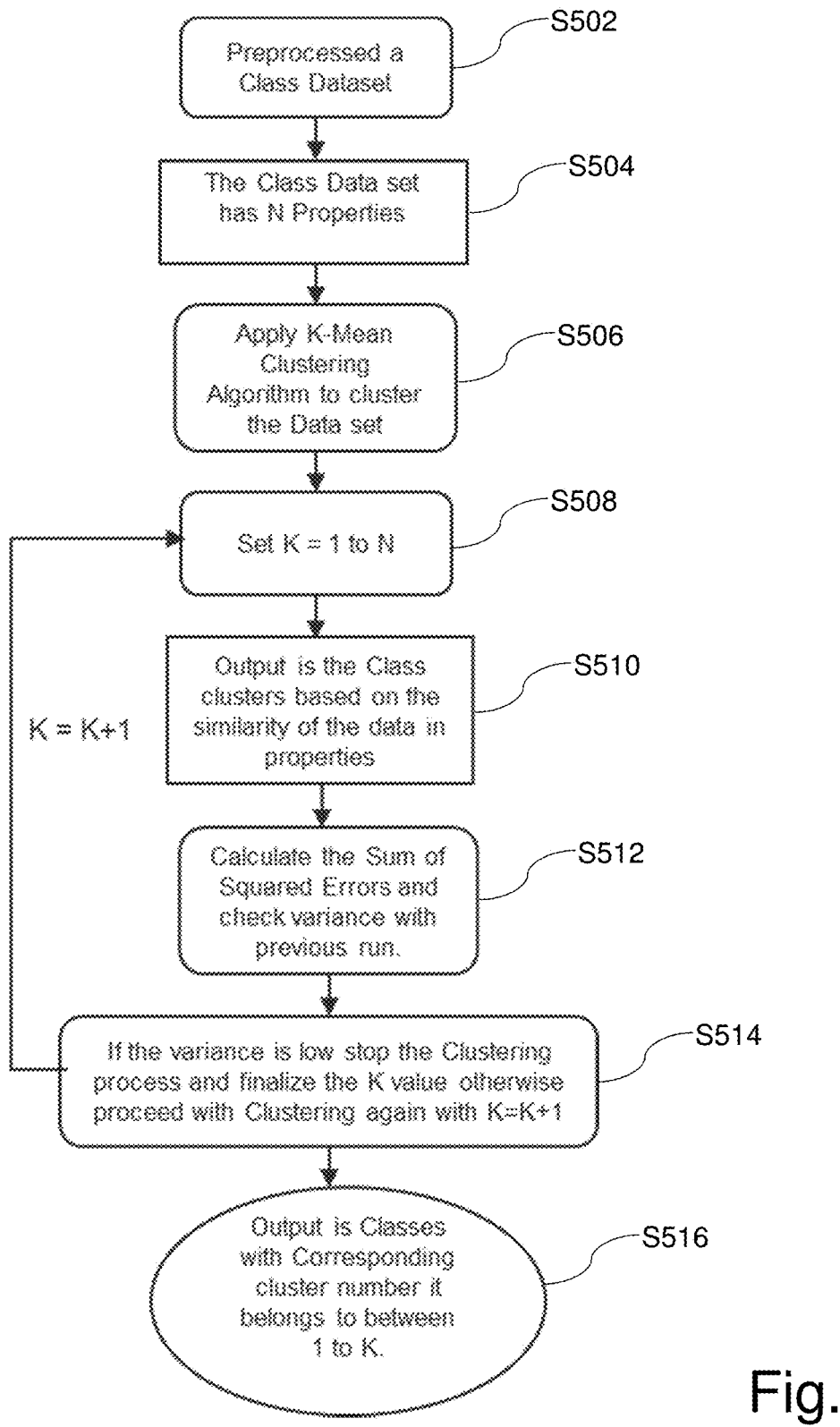
FIG. 5 is a flowchart showing how clustering analysis may be performed in accordance with certain example embodiments.

FIG. 5 is a flowchart showing how clustering analysis may be performed in accordance with certain example embodiments. As shown in FIG. 5, preprocessing is performed on the dataset (e.g., in accordance with the previous section) in step S502. The class dataset, once preprocessed, has N properties (step S504). After the dataset is ready, it is fed to an AI component. In step S506, the AI component uses ML algorithms like the k-means clustering algorithm for pattern matching and clustering the dataset into K clusters.

In the FIG. 5 example, the k-means clustering algorithm is applied to cluster the data set. K is set to 1 and runs to N, in a loop (step S508). As above, N is the number of observations and K is the number of clusters to be generated (initially set to 1 but increasable based on the processing to a maximum of N). In step S510, the output is the class clusters based on the similarity of the data in the properties. Additionally, in step S512, the sum of squared errors is calculated, and the variance is checked with the previous run. With regard to the latter, as indicated in step S514, if the variance is low, the clustering process is stopped and the K value is finalized; otherwise, proceed with clustering again for the next cluster by incrementing K, i.e., by setting K=K+1. The output in step S516 is classes with the corresponding cluster number it belongs to, between 1 and K. An automated elbow method can be used for determining the best K value for the dataset. In cluster analysis, the elbow method is a heuristic used in determining the number of clusters in a dataset that helps detects when the variance of squared error becomes low and flattened in comparison with the previous K, i.e., (K−1) and thus looks like an "elbow" when plotted. Different approaches may be used in different example embodiments. In certain example embodiments, the approach (or aspects of the approach) may be configurable.

Figures 6, 7:
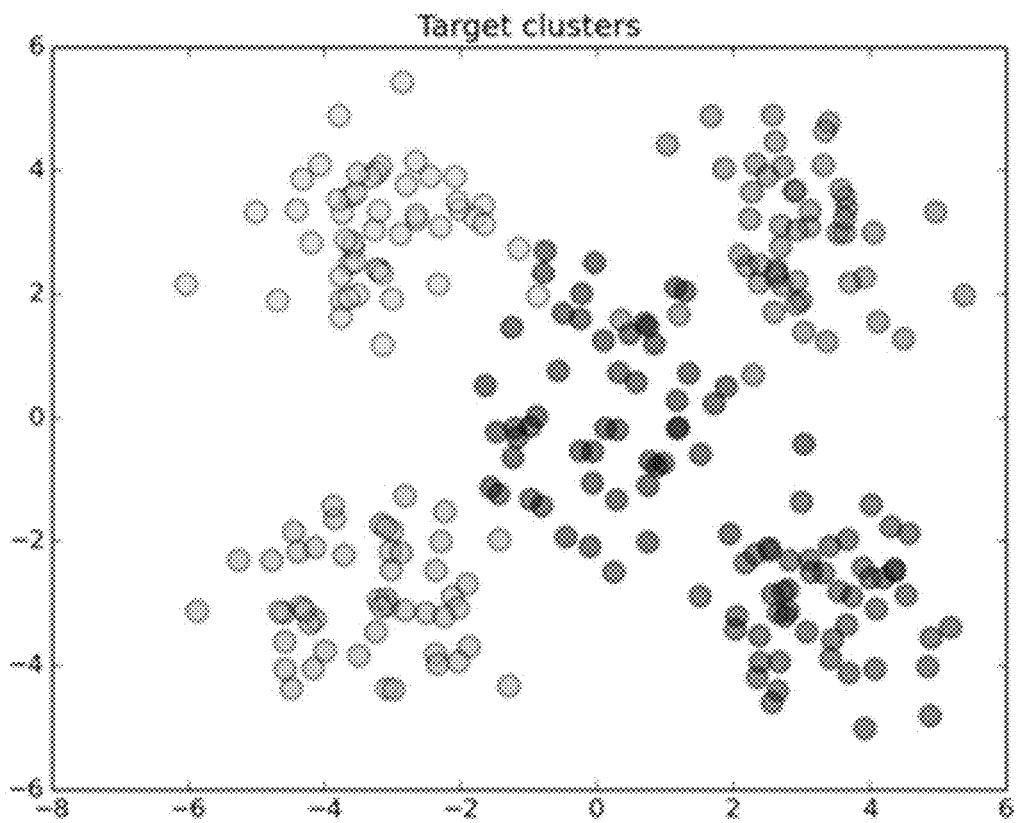
FIG. 6 is an example table showing output from the FIG. 5 example process in accordance with certain example embodiments.
FIG. 7 is a visual representation of the FIG. 6 output in accordance with certain example embodiments.

From a practical perspective, FIG. 6 is an example table showing output from the FIG. 5 example process in accordance with certain example embodiments, and FIG. 7 is a visual representation of the FIG. 6 output in accordance with certain example embodiments. The output shown in the FIG. 6 table shows all ApplicationID values with corresponding cluster indicators. The FIG. 6 and/or FIG. 7 may be presented to the user in certain example embodiments.

Example Property Score Analysis Related Techniques

Figure 8:
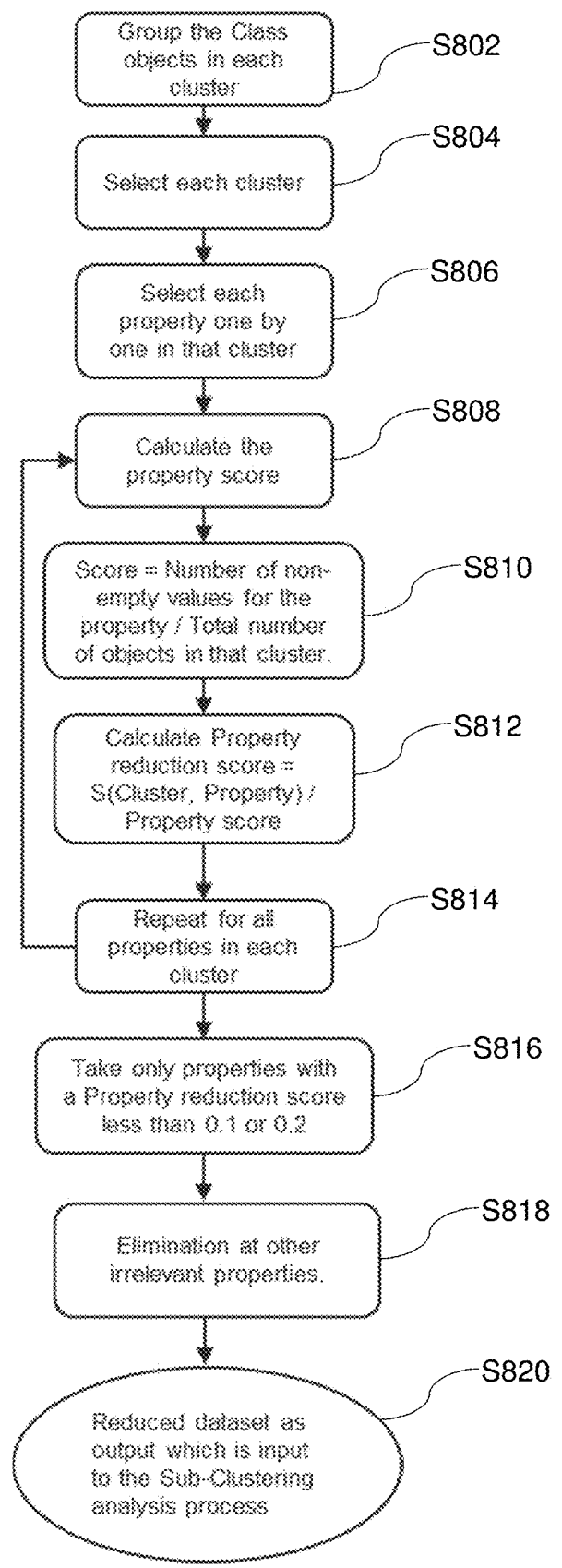
FIG. 8 is a flowchart showing example property score analysis and properties reduction related techniques that may be used in connection with certain example embodiments.

FIG. 8 is a flowchart showing example property score analysis and properties reduction related techniques that may be used in connection with certain example embodiments. In step S802, the output of the cluster analysis is taken; that is, analysis is performed on the class objects (e.g., properties of the class) in each cluster or group. A sub-process is performed for each cluster (see step S804). The class objects (e.g., properties) in each cluster are grouped. Consider, for example, application clusters. FIG. 9 is a table showing the applications clustered in Cluster ID 2, together with illustrative properties, in an example dataset.

In the selected cluster (in this case, the application cluster with ID 2), a process is performed for each property in that cluster (see step S806). Specifically, for each property, a property score is calculated in step S808. This calculation in certain example embodiments equals the number of non-empty values for the property divided by the total number of applications in that cluster (see S810). As indicated in step S814, this procedure is repeated for all properties in each cluster. This procedure results in a list of properties for each cluster, with the properties having scores. (Further details regarding the FIG. 8 flowchart are discussed below, as they pertain to properties reduction related techniques and thus are discussed in the subsequent section.)

The following demonstrates how the property score is calculated in the example dataset, at least in certain example embodiments. As will be appreciated from FIG. 9, the example dataset includes Applications in Cluster 2 having six properties (ResponsibleUser, Platform, Need for Change, ICTObject, Domain, and Application Type). As noted above, in certain example embodiments, property score is calculated as the number of non-empty values for the property divided by the total number of applications in that cluster. In this case, the empty values are the number of values in property that have "No Value", since "No Value" is the default value that was set when the value is empty. (It will be appreciated that "No Value" is distinguished from NULL value, as NULL values typically will be the ones that do not have or do not need a value, as described above.) Thus, in the example dataset, the property values are calculated as follows:

ResponsibleUser=10/14=0.71

Platform=10/14=0.71

Need for Change=11/14=0.78

ICTObject=14/14=1.0

Domain=3/14=0.21

Application Type=12/14=0.85

FIG. 10 is a table showing the property score values for application cluster ID 2 from the example dataset, and FIG. 11 is a table showing the property score values for all five application clusters in the example dataset.

Example Techniques for Properties Reduction (e.g., for Eliminating Irrelevant Properties)

Running the clustering with many properties can result in a very large number of dataset clusters with a smaller number of objects in each cluster. This is because irrelevant properties can skew the results of the final dataset. Thus, if there is a larger number of properties, the irrelevant properties can be removed to provide more optimized sub-clusters. Reducing the properties of the data can improve the speed of convergence and quality of results. This in turn can increase the accuracy of the imputation.

The following procedure may be used in properties reduction:

1. Consider each of the objects (properties) in each of the clusters.
2. For each object in the cluster, a distance from the centroid of the cluster D (Object, Cluster) is calculated.
3. For each of the properties in the cluster, the average/median X (Cluster, Property) of the values is calculated.
4. For each object in the cluster, a distance to this value X (Cluster, Property) is computed. The distance may be calculated as, for example, Y (Object, Cluster, Property)=[Object(Property)−X (Cluster, Property)]$^2$.
5. This is weighted with the distance the object is from the centroid of the cluster. Thus, for every property and cluster, a value Z (Cluster, Property) that is the sum of Y (Object, Cluster, Property)*D (Object, Cluster)$^2$ across all objects in the cluster is calculated. This is divided by the sum of D (Object, Cluster)$^2$ across all objects multiplied by the sum of Y (Object, Cluster, Property) across all objects. This provides a score value S (Cluster, Property), which is between 0 and 1. See step S812 in FIG. 8 in this regard.
6. The final property reduction score is calculated as S (Cluster, Property)/Property score.
7. All properties with a property reduction score less than 0.1 or 0.2 are considered when determining the population and properties for the second clustering, as indicated in step S816 in FIG. 8. A smaller value indicates good or sufficiently strong cohesion along these properties. Based on the testing and experiments, a score less than 0.1 or 0.2 has been found to provide better results compared to higher values. The exact threshold is configurable in certain example embodiments, and different thresholds may be used in different example use cases.
8. FIG. 12 is a table showing how the score for the property called "Need for Change" in the example dataset is calculated. The "No Values" from Need for Change property in FIG. 9 are replaced with the default value "1" for running the algorithms. Now, S=0.059 and the Final Score is equal to 0.059/0.78 or 0.075.
9. The property reduction is calculated for all the properties across the different clusters. The final scores that are less than 0.1 or 0.2 (or the other set threshold value) are considered for the sub-clustering. FIG. 13 is a table showing the results of properties reduction for the sample dataset. Based on the score, the domain property is eliminated from the dataset. See step S818 in FIG. 8.
10. The number of properties is reduced from the original dataset based on property reduction scoring and elimination of irrelevant properties. Current and prior art approaches including those described above do not proceed in this manner
11. As indicated in step S820 in FIG. 8, the reduced dataset is used for further processing and input to the sub-clustering analysis discussed below.

Example Sub-Clustering Analysis and Data Correction Related Techniques

Figure 14:
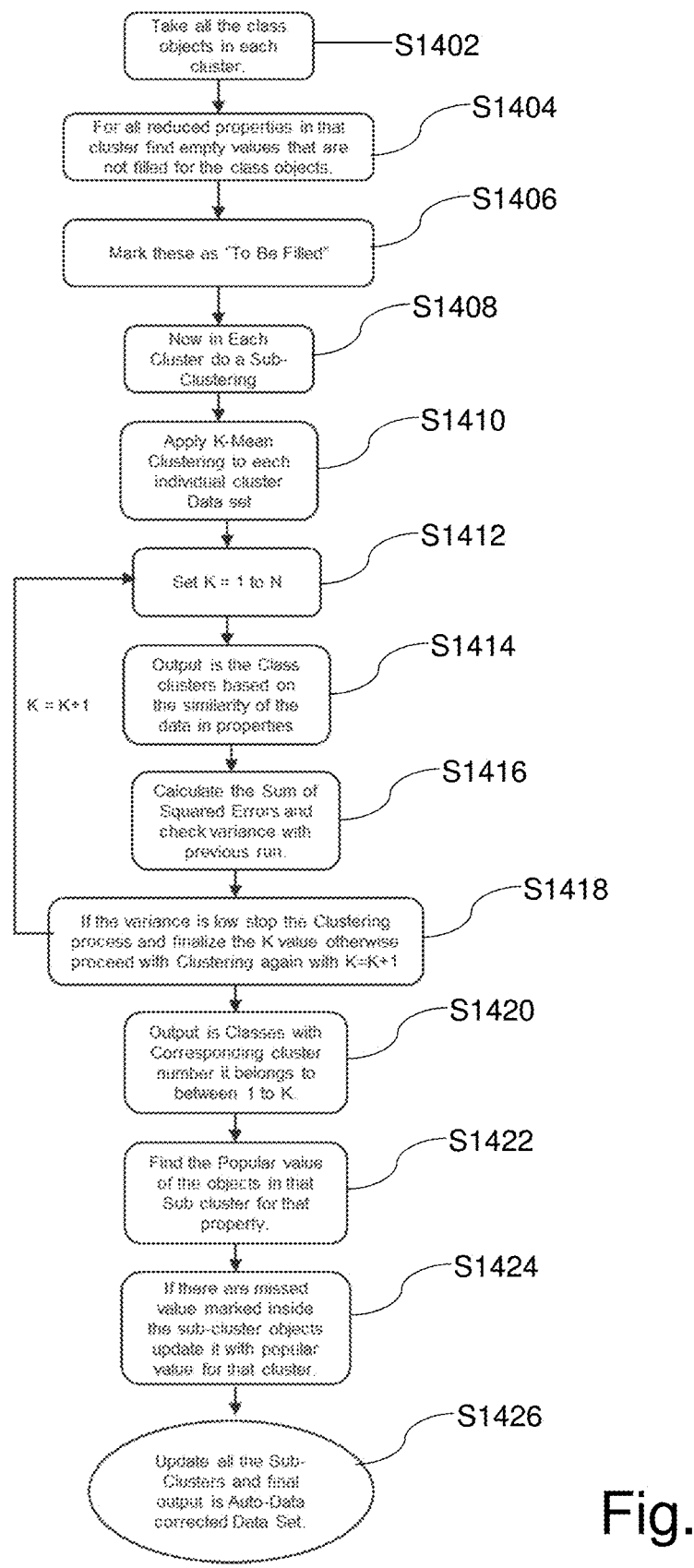
FIG. 14 is a flowchart showing an example sub-clustering processing that may be used in connection with certain example embodiments.

FIG. 14 is a flowchart showing an example sub-clustering processing that may be used in connection with certain example embodiments. As indicated in step S1402, the FIG. 14 process begins with a consideration of all of the class objects (in this case, all of the applications) in each cluster. In step S1404, for all properties of the property-reduced dataset in each cluster, empty values that are not filled for the class objects (applications) are found. In step S1406, these empty values are marked or otherwise tagged so that they are recognizable as "to be filled" values. FIG. 15 is a table showing empty values in the property reduced dataset marked as needing to be filed, in accordance with certain example embodiments. The FIG. 15 example shows the literal string "To Be Filled" as the marker, although it will be appreciated that other alphanumeric or other markers or tags may be used in different example embodiments.

In step S1408, in each cluster, sub-clustering is performed on the priority properties, namely, the property-reduced properties in each cluster. It is not necessary to perform sub-clustering on all properties, as a dataset with only the "priority properties" has been extracted. In other words, there are no other properties to work on, other than the priority properties in certain example embodiments. k-means clustering is performed in connection with each individual cluster dataset. In this regard, K is set from 1 to N in step S1412. Similar to the above, N is the number of observations and K is the number of sub-clusters to be generated. As indicated in step S1414, the output is the class clusters based on the similarity of the data/values of the properties. In step S1416, the sum of the squared errors is calculated, and the variance is checked with pervious runs. As indicated in step S1418, if the variance is low, the clustering process is stopped and the k-value is finalized; otherwise, K is incremented and clustering is once again performed (by returning to step S1412). As noted above, the elbow method or another approach may be used here.

The output generated in step S1420 includes a listing of classes with the corresponding sub-cluster number each belongs to (between 1 and K). FIG. 16 is a table showing example output from step S1420 in the FIG. 14 flowchart for Cluster ID 2 in the example dataset.

The sub-clustering is done to help expose differences within the primary clusters and to group them into smaller clusters with even higher similarity. In other words, the primary clustering is performed to find a base similarity and sub-clustering is performed to force the differences remaining in the primary clusters into yet smaller clusters. More specifically, the sub-clustering iteration is applied to the primary clustering dataset population and the properties with highest cohesion. This clustering allows residual differences in the population of primary clusters (properties or dimensions with values that are significantly different across the applications in the primary cluster) to be determined, thereby resulting in a set of data corrections in highly homogeneous datasets. Depending on the size of the original dataset and the number of properties or dimensions, the clustering iteration can be continued all the way to N degrees.

FIG. 17 is a table showing classes (applications) grouped based on Cluster ID and Sub-Cluster ID in the example dataset. The FIG. 17 table may be generated in preparation for or as a part of step S1422, which involves finding "popular" values of the objects in each sub-cluster for the priority property. These "popular" values in certain example embodiments correspond to the most used values of the objects in the sub-cluster for that property.

As indicated in step S1424, if there are missed values marked inside the sub-cluster objects, they are updated with the popular value for that sub-cluster. FIG. 18 is a table showing missed values in the example dataset updated with popular values for the properties in that sub-cluster. In step S1426, all of the sub-clusters are updated, and the final output is the auto-data corrected dataset. The results from the FIG. 18 table thus may be displayed to users in certain example embodiments.

Unlike at least some current and prior art approaches, the sub-clustering approach described above operates only on those properties determined to have (or to likely have) a high impact, e.g., as opposed to operating on all properties as the result of removal of irrelevant properties by Property reduction technique which is the output in step S820. This approach enables certain example embodiments to be more accurate and more reliable, while also potentially requiring less overall processing power and/or cycles. Certain example embodiments do not update all the empty values in a dataset. Instead, they more intelligently use property score analysis and sub-clustering techniques to identify only the empty values that need to be updated based on the scores identified in the analysis. This improves the accuracy of the data quality auto-correction.

As an example, if a dataset has 100 rows and 100 properties, there would be a total of 10,000 values in the dataset. Assume for this explanation that 300 of such values are empty. With a more conventional approach, all the 300 missing values would be updated. By contrast, using the analysis techniques of certain example embodiments, it becomes possible to predict which among the 300 empty values is/are the most probable missed values of significance. It then becomes possible to arrive at a much number of values (e.g., 50) that need to be updated with correct values. This makes a high impact in accuracy of auto correction of dataset.

It will be appreciated that certain example embodiments in essence involve four different categories of content. The first category is valid, non-null data, which could be a specific measure, data element, or the like, that is non-NULL. The second category is NULL content where a property initially contains no value. Because this data would be illegal in or otherwise inappropriate for (e.g., not processible by) the ML algorithms, it is first replaced by the third category of content. This third category of content is a default value, which in some ways may be thought of as being a simple value (e.g., the simplest value for a given data type) that replaces the NULL value, e.g., only so that the first ML algorithm can be executed. The fourth category of content is the best predicted value, which is the final suggestion for an initially NULL valued property.

As noted above, certain example embodiments are able to generate reports detailing how the sparse dataset related to this selected class can be corrected and completed, e.g., what missing values can be added, how the values to be added are calculated, etc. These reports may be reviewed by an authorized user or the like. Certain example embodiments may automatically update the dataset, or the user may cause the system to supply to the dataset the missing values, e.g., after having a chance to review reports. The output may be provided across the interface over which the original dataset was received, stored to the same storage location (e.g., replacing the original dataset or being stored as an alternate version), output to a display device on a computing terminal or the like, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data imputation computer system, comprising:
an interface;
at least one processor and a memory, the memory storing computer code executable by the at least one processor to perform functionality comprising:
receiving over the interface a sparse dataset, the dataset having data records organized in one or more classes, each class having a plurality of properties associated therewith;
dividing the data records in the dataset into a plurality of groups, each group including data records having properties with similar values;
for each group, identifying one or more properties of the records in the respective group that is/are to be ignored based on both record distances with respect to the records in the group, and distances among values for each of the properties of the records in the respective group;
further dividing the data records in the groups into sub-groups without regard to the one or more properties that is/are to be ignored, wherein in at least a first group includes a set of data records that is smaller and more cohesive than the data records of the groups from which the set of data records of the first sub group were generated;
for each sub-group:
identifying values of the data records therein that are empty but are to be filled in;
based on the data records in the respective sub-group, determining predicted values to be applied to the values identified as being empty but needing to be filled in; and applying the predicted values to be applied to the values identified as being empty but needing to be filled in; and providing as output the dataset corrected and/or completed using the applied predicted values.

2. The system of claim 1, wherein the groups are clusters generated via a first clustering algorithm and wherein the sub-groups are sub-clusters generated from the clusters using a second clustering algorithm.

3. The system of claim 2, wherein the first and second clustering algorithms are different from one another.

4. The system of claim 2, wherein the first clustering algorithm is a k-means clustering algorithm.

5. The system of claim 2, wherein the second clustering algorithm is a sequential k-Nearest Neighbor clustering algorithm.

6. The system of claim 2, wherein the record distances with respect to the records in the group are distances to the respective cluster's centroid.

7. The system of claim 1, wherein the memory stores further computer code executable by the at least one processor to perform further functionality comprising receiving an identification of one of the one or more classes, wherein the division of the data records in the dataset into the plurality of groups divides the data records based on the identified class(es).

8. The system of claim 1, wherein the identifying further comprises calculating a property score for each property in each group, the property score for a given property in a given group being the number of non-empty values for the given property divided by the total number of data records in the given group.

9. The system of claim 8, wherein the identifying further comprises:
weighting the distances among the values for each of the properties of the records in the respective group with the record distances with respect to the records in the group;
calculating final property reduction scores by dividing the weighted distances by the corresponding property scores; and
determining which property(ies) is/are to be ignored based on a comparison between the calculated final property reduction scores and a predetermined threshold.

10. The system of claim 1, wherein the predicted value for a given property in a given sub-group is the most common non-null value for the given property among the data records in the given sub-group.

11. A data imputation method for use with a computing system including at least one processor and a memory, the method comprising:
using the at least one processor,
receiving over an interface a sparse dataset, the dataset having data records organized in one or more classes, each class having a plurality of properties associated therewith;
dividing the data records in the dataset into a plurality of groups, each group including data records having properties with similar values;
for each group, identifying one or more properties of the records in the respective group that is/are to be ignored based on both record distances with respect to the records in the group, and distances among values for each of the properties of the records in the respective group;

further dividing the data records in the groups into sub-groups without regard to the one or more properties that is/are to be ignored, at least a first subgroup includes a set of data records that is smaller and more cohesive than the data records of the groups from which the set of data records of the first sub group were generated;
for each sub-group:
identifying values of the data records therein that are empty but are to be filled in;
based on the data records in the respective sub-group, determining predicted values to be applied to the values identified as being empty but needing to be filled in; and
applying the predicted values to be applied to the values identified as being empty but needing to be filled in; and
providing as output the dataset corrected and/or completed using the applied predicted values.

12. The method of claim 11, wherein the group are clusters generated via a first clustering algorithm and wherein the sub-groups are sub-clusters generated from the clusters using a second clustering algorithm.

13. The method of claim 12, wherein the first clustering algorithm is a k-means clustering algorithm and the second clustering algorithm is a sequential k-Nearest Neighbor clustering algorithm.

14. The method of claim 12, wherein the record distances with respect to the records in the group are distances to the respective cluster's centroid.

15. The method of claim 11, wherein the identifying further comprises:
calculating a property score for each property in each group, the property score for a given property in a given group being the number of non-empty values for the given property divided by the total number of data records in the given group;
weighting the distances among the values for each of the properties of the records in the respective group with the record distances with respect to the records in the group;
calculating final property reduction scores by dividing the weighted distances by the corresponding property scores; and
determining which property(ies) is/are to be ignored based on a comparison between the calculated final property reduction scores and a predetermined threshold.

16. The method of claim 11, wherein the predicted value for a given property in a given sub-group is the most common non-null value for the given property among the data records in the given sub-group.

17. A non-transitory computer readable storage medium tangibly storing instructions that, when executed by at least one processor of a computing system, cause the computing system to perform functionality comprising:
receiving over an interface a sparse dataset, the dataset having data records organized in one or more classes, each class having a plurality of properties associated therewith;
dividing the data records in the dataset into a plurality of groups, each group including data records having properties with similar values;
for each group, identifying one or more properties of the records in the respective group that is/are to be ignored based on both record distances with respect to the records in the group, and distances among values for each of the properties of the records in the respective group;

further dividing the data records in the groups into sub-groups without regard to the one or more properties that is/are to be ignored, wherein at least a first subgroup includes a set of data records that is smaller and more cohesive than the data records of the groups from which from which the set of data records of the first sub group were generated;

for each sub-group:
  identifying values of the data records therein that are empty but are to be filled in;
  based on the data records in the respective sub-group, determining predicted values to be applied to the values identified as being empty but needing to be filled in; and
  applying the predicted values to be applied to the values identified as being empty but needing to be filled in; and providing as output the dataset corrected and/or completed using the applied predicted values.

18. The non-transitory computer readable storage medium of claim 17, wherein the group are clusters generated via a k-means clustering algorithm and wherein the sub-groups are sub-clusters generated from the clusters using a sequential k-Nearest Neighbor clustering algorithm.

19. The non-transitory computer readable storage medium of claim 18, wherein the record distances with respect to the records in the group are distances to the respective cluster's centroid.

20. The non-transitory computer readable storage medium of claim 19, wherein the identifying further comprises:
  calculating a property score for each property in each group, the property score for a given property in a given group being the number of non-empty values for the given property divided by the total number of data records in the given group;
  weighting the distances among the values for each of the properties of the records in the respective group with the record distances with respect to the records in the group;
  calculating final property reduction scores by dividing the weighted distances by the corresponding property scores; and
  determining which property(ies) is/are to be ignored based on a comparison between the calculated final property reduction scores and a predetermined threshold.

21. The non-transitory computer readable storage medium of claim 17, wherein the predicted value for a given property in a given sub-group is the most common non-null value for the given property among the data records in the given sub-group.

* * * * *